US012637331B2

(12) United States Patent
Roberts

(10) Patent No.: US 12,637,331 B2
(45) Date of Patent: May 26, 2026

(54) ESCALATOR COMBPLATE RETRACTION DEVICE

(71) Applicant: Otis Elevator Company, Farmington, CT (US)

(72) Inventor: Randall Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 233 days.

(21) Appl. No.: 18/449,045

(22) Filed: Aug. 14, 2023

(65) Prior Publication Data

US 2025/0059004 A1 Feb. 20, 2025

(51) Int. Cl.

*B66B 29/06* (2006.01)
*B66B 23/14* (2006.01)
*B66B 21/04* (2006.01)

(52) U.S. Cl.

CPC .............. *B66B 29/06* (2013.01); *B66B 23/14* (2013.01); *B66B 21/04* (2013.01)

(58) Field of Classification Search

None
See application file for complete search history.

(56) References Cited

U.S. PATENT DOCUMENTS

| | | | | |
|---|---|---|---|---|
| 4,800,998 | A * | 1/1989 | Myrick | B66B 29/06 198/325 |
| 7,597,181 | B2 * | 10/2009 | Illedits | B66B 29/06 198/325 |
| 9,162,851 | B2 | 10/2015 | Fan Jin Quan | |
| 10,071,884 | B2 * | 9/2018 | Li | B66B 29/06 |
| 10,336,582 | B2 | 7/2019 | Gartner et al. | |
| 2019/0112162 | A1 * | 4/2019 | Schedl | B66B 21/04 |

FOREIGN PATENT DOCUMENTS

| | | | | | |
|---|---|---|---|---|---|
| CN | 204508544 | U | * | 7/2015 | |
| CN | 109502468 | A | * | 3/2019 | B66B 29/06 |
| CN | 109573803 | A | * | 4/2019 | B66B 29/06 |
| CN | 214326869 | U | * | 10/2021 | |
| CN | 214652929 | U | * | 11/2021 | |
| EP | 0801021 | A2 | * | 10/1997 | B66B 29/005 |

OTHER PUBLICATIONS

European Search Report for EP24193968.5, ssued Jan. 14, 2025, 6 pages.

* cited by examiner

*Primary Examiner* — Gene O Crawford
*Assistant Examiner* — Muhammad Awais
(74) *Attorney, Agent, or Firm* — CANTOR COLBURN LLP

(57) ABSTRACT

An escalator system includes a moving step including a plurality of grooves and drivable in a travel direction. A combplate is located at at least a downstream end of the moving step relative to the travel direction at a step-combplate interface. A retraction device is configured to move the combplate along the travel direction from a normal position toward a retracted position when an entrapment of an object is detected at the step-combplate interface.

17 Claims, 4 Drawing Sheets

ESCALATOR COMBPLATE RETRACTION DEVICE

BACKGROUND

The present disclosure relates to escalator systems and, in particular, to combplate configurations of an escalator.

Conveyors of people, such as escalators and moving walkways, usually include a conveyance band that moves with people standing on it between opposing landing zones, driving machines that drive movement of the conveyance band and combplate. The conveyance band extends and moves between the opposing landing zones and has a surface that often includes cleats and grooves. The combplates are provided at the opposing landing zones. Each combplate includes teeth that extend into the grooves of the surface of the conveyance band as the conveyance band moves relative to each combplate and the cleats move along each of the teeth.

The interface between the conveyance band and the stationary combplate at the escalator exit is a safety risk for entrapments due to the relative motion of the conveyance band relative to the combplate. Therefore, a need exists for an apparatus that can easily release caught items such as parts of shoes, shoelaces or other clothing items.

BRIEF DESCRIPTION

In an exemplary embodiment, an escalator system includes a moving step including a plurality of grooves and drivable in a travel direction. A combplate is located at at least a downstream end of the moving step relative to the travel direction at a step-combplate interface. A retraction device is configured to move the combplate along the travel direction from a normal position toward a retracted position when an entrapment of an object is detected at the step-combplate interface.

Additionally or alternatively, in this or other embodiments the retraction device includes one or more retraction springs configured to bias the combplate toward the retracted position.

Additionally or alternatively, in this or other embodiments one or more solenoids are configured to retain the combplate in the normal position. The one or more solenoids are activated to release the combplate when an entrapment is detected, allowing for movement of the complete toward the retracted position.

Additionally or alternatively, in this or other embodiments the entrapment is detected via an entrapment detection sensor.

Additionally or alternatively, in this or other embodiments the entrapment detection sensor is one of a light detection and ranging (LIDAR) sensor or a tactile force sensor.

Additionally or alternatively, in this or other embodiments a reset actuator is configured to urge the combplate from the retracted position toward the normal position.

Additionally or alternatively, in this or other embodiments the reset actuator is activated at one or more of the absence of detection of an entrapment or after a preselected time duration after the detection of an entrapment.

Additionally or alternatively, in this or other embodiments the combplate is configured to travel in the range of 10 millimeters to 20 millimeters from the normal position to the retracted position.

In another exemplary embodiment, a combplate assembly of an escalator includes a combplate partially defining a step-combplate interface of the escalator. The combplate includes a plurality of combplate teeth. A retraction device is configured to move the combplate along a travel direction from a normal position toward a retracted position when an entrapment of an object is detected at the step-combplate interface.

Additionally or alternatively, in this or other embodiments the retraction device includes one or more retraction springs configured to bias the combplate toward the retracted position.

Additionally or alternatively, in this or other embodiments one or more solenoids are configured to retain the combplate in the normal position. The one or more solenoids are activated to release the combplate when an entrapment is detected, allowing for movement of the complete toward the retracted position.

Additionally or alternatively, in this or other embodiments the entrapment is detected via an entrapment detection sensor.

Additionally or alternatively, in this or other embodiments the entrapment detection sensor is one of a light detection and ranging (LIDAR) sensor or a tactile force sensor.

Additionally or alternatively, in this or other embodiments a reset actuator is configured to urge the combplate from the retracted position toward the normal position.

Additionally or alternatively, in this or other embodiments the reset actuator is activated at one or more of the absence of detection of an entrapment, after a preselected time duration after the detection of an entrapment, or via a manually operated reset switch.

Additionally or alternatively, in this or other embodiments the combplate is configured to travel in the range of 10 millimeters to 20 millimeters from the normal position to the retracted position.

In yet another exemplary embodiment, a method of operating an escalator includes driving a moving step including a plurality of grooves in a travel direction toward a combplate. The combplate is located at at least a downstream end of the moving step relative to the travel direction at a step-combplate interface. An entrapment at the step-combplate interface is detected, and a retraction device is activated to move the combplate along the travel direction from a normal position toward a retracted position.

Additionally or alternatively, in this or other embodiments one or more solenoids are activated when an entrapment is detected, allowing for movement of the complete toward the retracted position.

Additionally or alternatively, in this or other embodiments the entrapment is detected via one of a light detection and ranging (LIDAR) sensor or a tactile force sensor.

Additionally or alternatively, in this or other embodiments the combplate is urged toward the normal position via activation of a reset actuator, the reset actuator activated at one or more of the absence of detection of an entrapment or after a preselected time duration after the detection of an entrapment.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
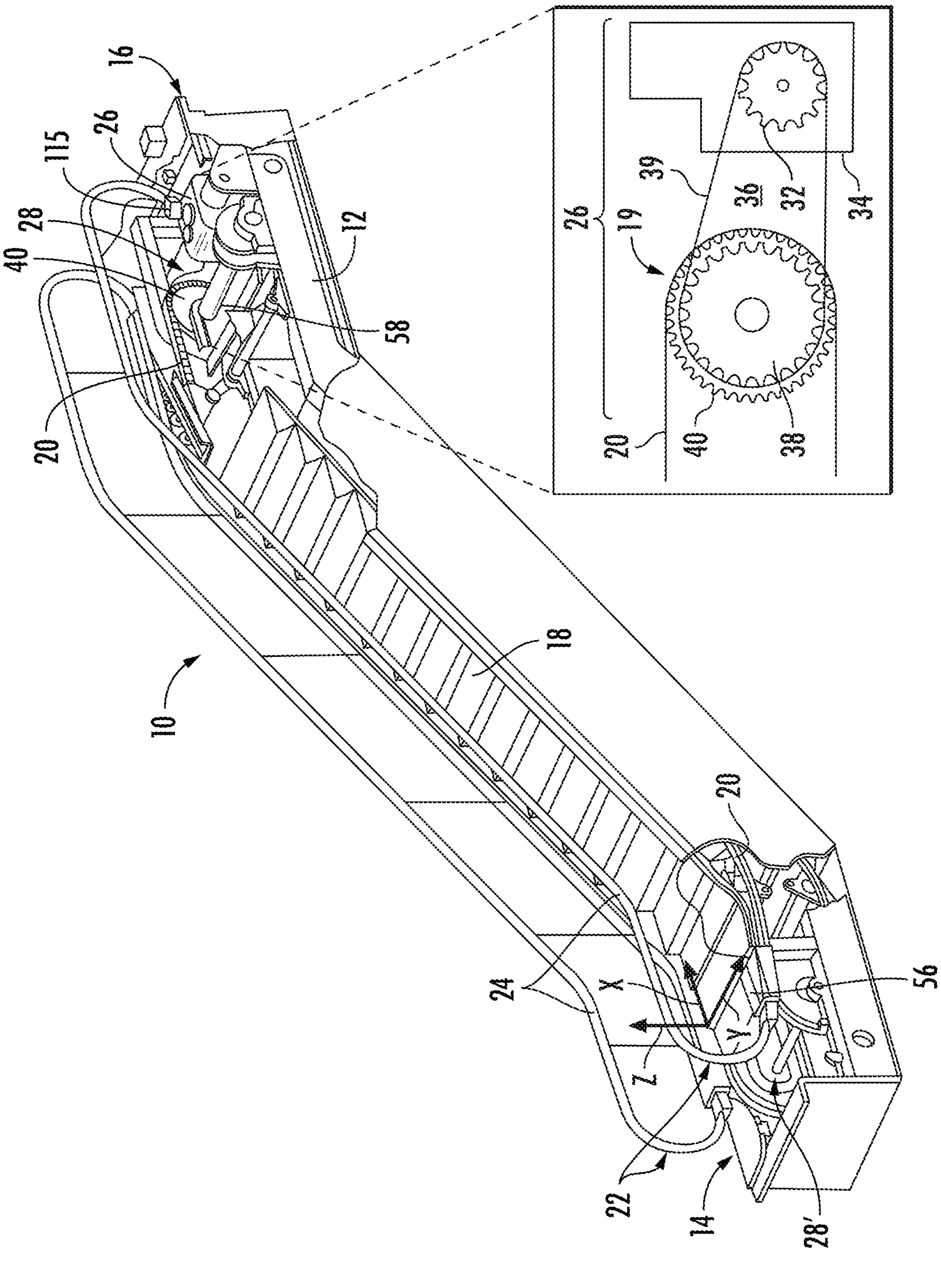
FIG. 1 is a perspective view of an embodiment of an escalator.

FIG. 1 illustrates an embodiment of an escalator 10. It should become apparent in the ensuing description that the invention is applicable to other passenger conveyor systems, such as moving walks. The escalator 10 generally includes a truss 12 extending between a lower landing 14 and an upper landing 16. A plurality of sequentially connected steps or tread plates 18 are connected to a step chain 20 and travel through a closed loop path within the truss 12. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the tread plates 18 and/or handrails 24 through the step chain 20. The drive machine 26 operates to move the tread plates 18 in a chosen direction at a desired speed under normal operating conditions.

The tread plates 18 make a 180 degree heading change in a turn-around area 19 located under the lower landing 14 and upper landing 16. The tread plates 18 are pivotally attached to the step chain 20 and follow a closed loop path of the step chain 20, running from one landing to the other, and back again.

The drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member 38, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments the second drive member 38 may be an idle gear or similar device that is driven by the operative connection between the first drive member 32 and the second drive member 38 by means of tension member 39. The tension member 39 travels around a loop set by the first drive member 32 and the second drive member 38, which herein after may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

The escalator 10 also includes a controller 115 that is in electronic communication with the drive motor 34. The controller 115 may be located, as shown, in the machine space 28 of the escalator 10 and is configured to control the operation of the escalator 10. For example, the controller 115 may provide drive signals to the drive motor 34 to control the acceleration, deceleration, stopping, etc. of the tread plates 18 through the step chain 20. The controller 115 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Although described herein as a particular escalator drive system and particular components, this is merely exemplary, and those of skill in the art will appreciate that other escalator system configurations may operate with the present disclosure.

Figure 2:
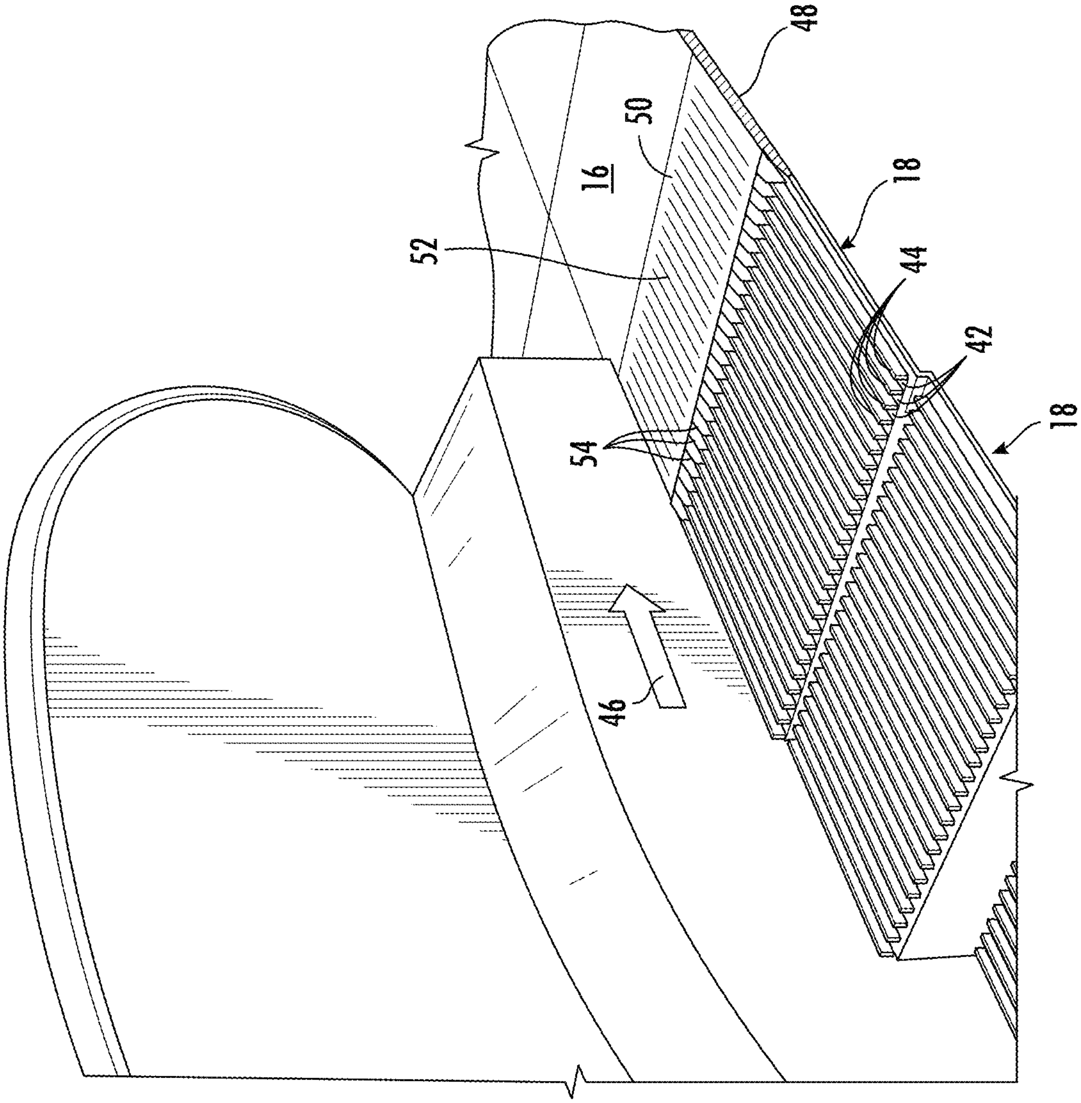
FIG. 2 is a perspective view of an embodiment of a combplate interface with a tread plate.

Referring now to FIG. 2, a plurality of tread plates 18 are linked to define a conveyance band, that moves between the lower landing 14 and the upper landing 16. Each of the tread plates 18 has a travel surface that includes a plurality of grooves 42 and cleats 44 that extend in a travel direction 46 of the escalator 10. Combplate assemblies 48 are provided at each of the lower landing 14 and the upper landing 16. The combplate assemblies 48 each include a combplate 50 having a plate body 52 and a plurality of teeth 54 that extend from the plate body 52 and into the plurality of grooves 42 of the tread plates 18 as tread plates 18 move relative to each combplate 48 and the cleats 44 move along each of the teeth 54.

Figure 3:
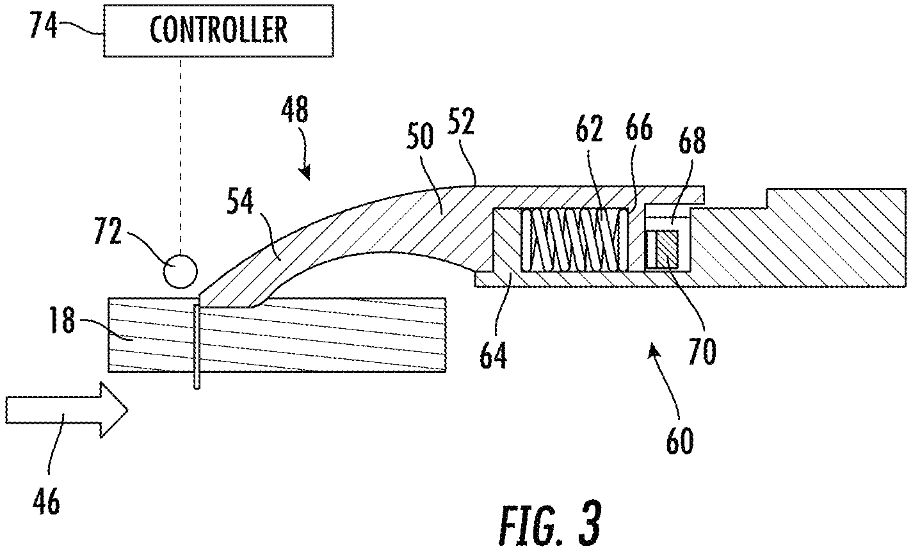
FIG. 3 is a side view of an embodiment of a combplate assembly in a normal position.
Figure 4:
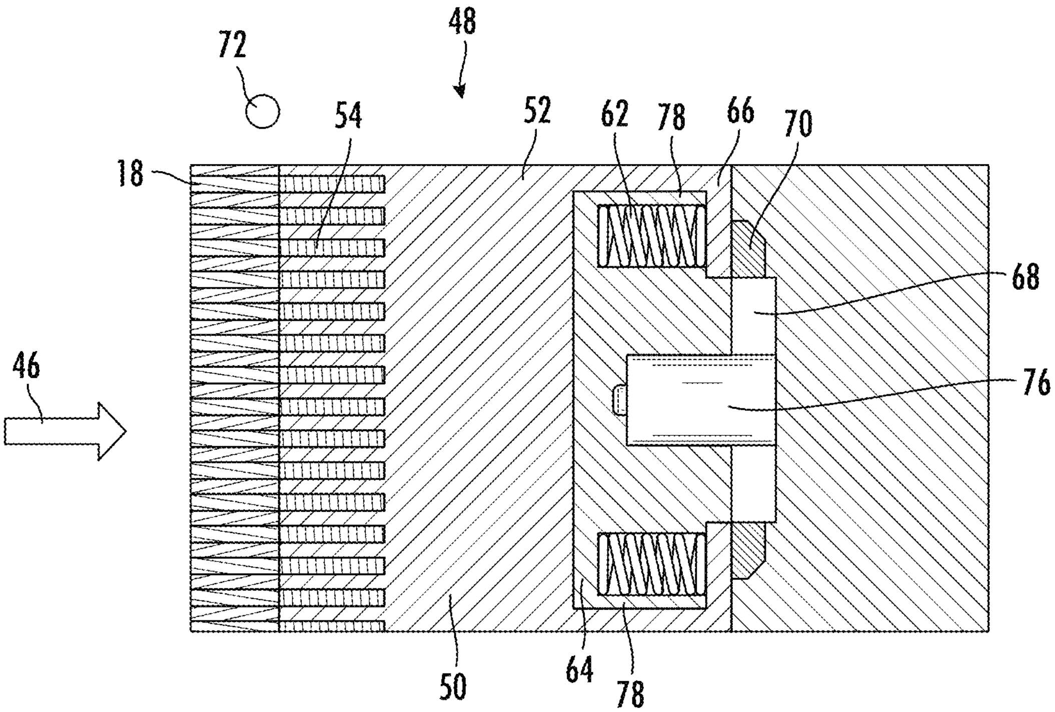
FIG. 4 is a plan view of an embodiment of a combplate assembly in the normal position.

Referring again to FIG. 1, the landings 14, 16 and combplates assemblies 48 are located at an upstream end 56 and a downstream end 58 of the conveyance band, relative to the travel direction 46 of the escalator 10. Referring now to FIGS. 3 and 4, the combplate assembly 48 located at least at the downstream end 58 includes a release device 60 configured to move the combplate 50 in the travel direction 46 to release caught items, such as parts of bodies, clothing or the like. The release device 60 is illustrated in a normal position in FIGS. 3 and 4, and in a retracted position in FIGS. 5 and 6.

Referring again to FIGS. 3 and 4, one or more retraction springs 62 are located between a landing flange 64 and a combplate flange 66, which extends from the plate body 52.

Figure 5:
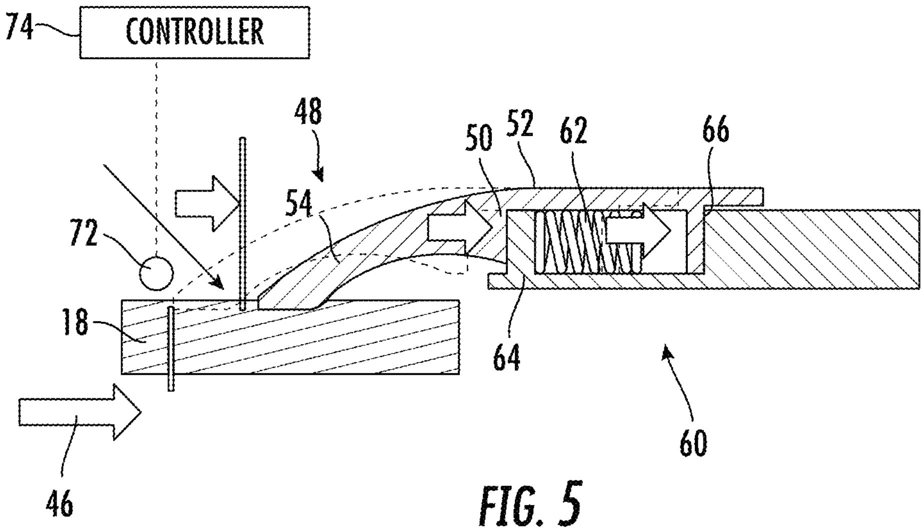
FIG. 5 is a side view of an embodiment of a combplate assembly in a retracted position.
Figure 6:
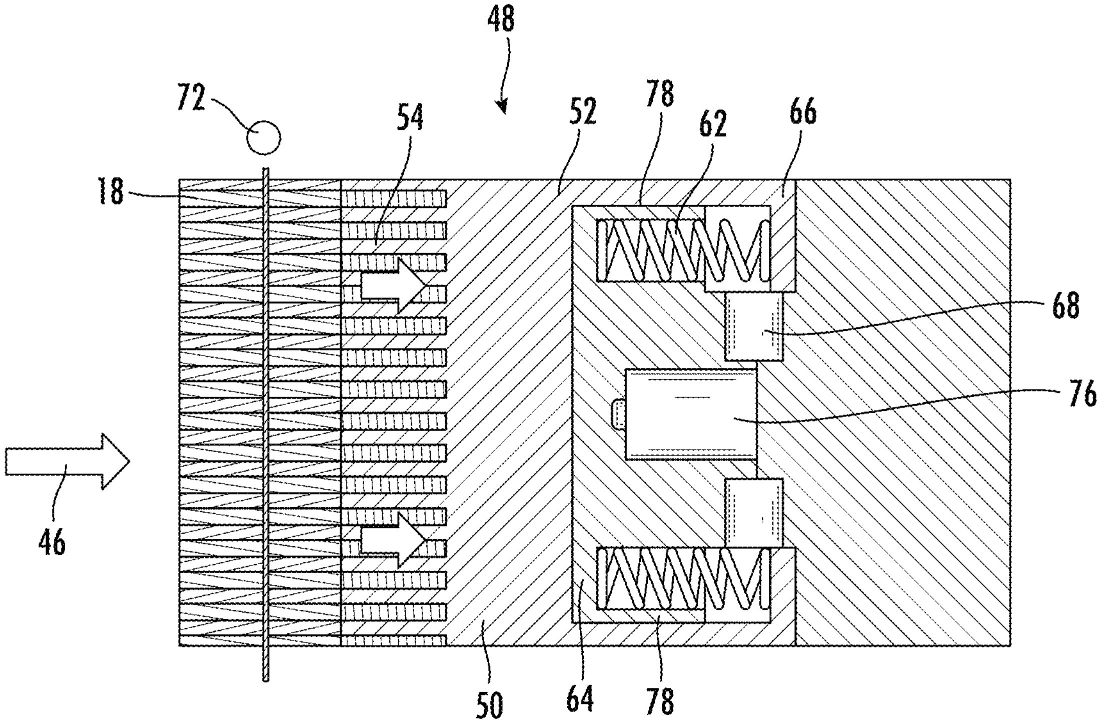
FIG. 6 is a plan view of an embodiment of a combplate assembly in the retracted position.

In the embodiments illustrated herein, two retraction springs 62 are utilized. One skilled in the art, however, will readily appreciate that other numbers of retraction springs 62, for example, one, three or four retraction springs 62 may be utilized in other embodiments. The retraction springs 62 bias the position of the combplate 50 toward the retracted position. To keep the combplate 50 in the normal position, the release device 60 includes one or more solenoids 68 having solenoid pistons 70 that are extended to block travel of the combplate flange 66 and thus the combplate 50. Two solenoids 68 are illustrated herein, but one skilled in the art will readily appreciate that other numbers of solenoids 68, such as one, three or four solenoids 68, may be utilized in other embodiments. The solenoids 68, when energized, retract the solenoid pistons 70 to unblock the combplate flange 66 allowing the retraction springs 62 to urge the combplate 50 to travel to the retracted position, as illustrated in FIGS. 5 and 6. In some embodiments, the combplate 50 travels in the range of, for example, 10 mm-20 mm, between the normal position and the retracted position. The movement of the complete 50 along the travel direction 46 temporarily reverses the relative motion of the plurality of treads 18 relative to the combplate 50, giving the passenger time and opportunity to pull out the caught item, avoiding a riskier serious entrapment.

The entrapment may be detected by, for example, an entrapment detection sensor 72 such as a light detection and ranging (LIDAR) sensor, such as illustrated herein, or a tactile force sensor. When an entrapment is detected by the detection sensor 72, a signal is sent from a controller 74 to the solenoids 68 to energize the solenoids 68 and retract the solenoid pistons 70 allowing the retraction springs 62 to urge the combplate 50 toward the retracted position. In other embodiments, the retraction of the combplate 50 is triggered passively, by a force of the entrapment overcoming a biasing force of the retraction springs 62, and thus urging the combplate 50 toward the retracted position. While in the illustrated embodiments retraction is accomplished by retraction of the solenoid pistons 70 and force from the retraction springs 62, in other embodiments other retraction devices may be utilized. The other retraction devices include, but are not limited to, linear or rotary motors, magnets, solenoids, hydraulic actuators, or the like.

The combplate 50 may be retracted along a path defined by a slotted guide path 78 with which at least a portion of the combplate 50, such as the plate body 52 is engaged with, such that the complete 50 is retracted along a desired path, typically a straight line. While in the illustrated embodiments the combplate 50 is a unitary across the combplate 50 width, in other embodiments the combplate 50 may be segmented along its width into for example, 2, 3 or 4 segments, with each segment including a retraction device, to allow for independent detection of entrapment at and retraction of one or more of the combplate segments depending on the location of the entrapment.

Once in the retracted position, the combplate 50 may be returned to the normal position by activating a reset actuator 76. The reset actuator 76 urges the combplate 50 toward the normal position, and once in the normal position, the solenoids 68 are de-energized to allow the solenoid pistons 70 to extend and block the path of the combplate 50 thus locking the combplate 50 in the normal position. The reset actuator 76 may be activated based on, for example, no longer detecting an entrapment at the detection sensor 72, or alternatively at a preselected time duration after the combplate 50 is moved to the retracted position. In other embodiments, the reset actuator 76 may activated by a manually operated reset switch (not shown).

The retraction of the combplate 50 allows for any caught items to be removed from the interface between the combplate 50 and the tread plates 18, thus preventing injury to an escalator passenger. Further, the combplate 50 is retracted while the tread plates 18 are still moving in the travel direction 46, and does not require stopping of the escalator 10. Such a localized response does not create a safety risk for other passengers of the escalator 10 that would occur with engagement of an escalator safety brake.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An escalator system, comprising:

a moving step including a plurality of grooves and drivable in a travel direction;

a combplate disposed at at least a downstream end of the moving step relative to the travel direction at a step-combplate interface; and a retraction device configured to move the combplate along the travel direction from a normal position toward a retracted position when an entrapment of an object is detected at the step-combplate interface;

wherein the retraction device includes one or more solenoids to retain the combplate in the normal position, the one or more solenoids including one or more solenoid pistons extending laterally at least partially across the combplate to block movement of the combplate;

wherein the one or more solenoids are activated to retract the one or more solenoid pistons to release the combplate when an entrapment is detected, allowing for movement of the combplate toward the retracted position.

2. The escalator system of claim 1, wherein the retraction device includes one or more retraction springs configured to bias the combplate toward the retracted position.

3. The escalator system of claim 1, wherein the entrapment is detected via an entrapment detection sensor.

4. The escalator system of claim 3, wherein the entrapment detection sensor is one of a light detection and ranging (LIDAR) sensor or a tactile force sensor.

5. The escalator system of claim 1, further comprising a reset actuator configured to urge the combplate from the retracted position toward the normal position.

6. The escalator system of claim 5, wherein the reset actuator is activated at one or more of the absence of detection of an entrapment or after a preselected time duration after the detection of an entrapment.

7. The escalator system of claim 1, wherein the combplate is configured to travel in the range of 10 millimeters to 20 millimeters from the normal position to the retracted position.

8. A combplate assembly of an escalator, comprising:

a combplate partially defining a step-combplate interface of the escalator, the combplate including a plurality of combplate teeth;

a retraction device configured to move the combplate along a travel direction from a normal position toward a retracted position when an entrapment of an object is detected at the step-combplate interface;

wherein the retraction device includes one or more solenoids to retain the combplate in the normal position, the one or more solenoids including one or more solenoid pistons extending laterally at least partially across the combplate to block movement of the combplate;

wherein the one or more solenoids are activated to retract the one or more solenoid pistons to release the combplate when an entrapment is detected, allowing for movement of the combplate toward the retracted position.

9. The combplate assembly of claim 8, wherein the retraction device includes one or more retraction springs configured to bias the combplate toward the retracted position.

10. The combplate assembly of claim 8, wherein the entrapment is detected via an entrapment detection sensor.

11. The combplate assembly of claim 10, wherein the entrapment detection sensor is one of a light detection and ranging (LIDAR) sensor or a tactile force sensor.

12. The combplate assembly of claim 8, further comprising a reset actuator configured to urge the combplate from the retracted position toward the normal position.

13. The combplate assembly of claim 12, wherein the reset actuator is activated at one or more of the absence of detection of an entrapment, after a preselected time duration after the detection of an entrapment, or via a manually operated reset switch.

14. The combplate assembly of claim 8, wherein the combplate is configured to travel in the range of 10 millimeters to 20 millimeters from the normal position to the retracted position.

15. A method of operating an escalator, comprising:

driving a moving step including a plurality of grooves in a travel direction toward a combplate, the combplate disposed at at least a downstream end of the moving step relative to the travel direction at a step-combplate interface;

detecting an entrapment at the step-combplate interface; and activating a retraction device to move the combplate along the travel direction from a normal position toward a retracted position;

wherein when an entrapment is detected, one or more solenoids are activated to move one or more solenoid pistons from an extended position at least partially blocking the combplate laterally to a retracted position allowing for movement of the combplate.

16. The method of claim 15, further comprising detecting the entrapment via one of a light detection and ranging (LIDAR) sensor or a tactile force sensor.

17. The method of claim 15, further comprising urging the combplate toward the normal position via activation of a reset actuator, the reset actuator activated at one or more of the absence of detection of an entrapment or after a preselected time duration after the detection of an entrapment.

* * * * *